US007289876B2

(12) United States Patent
Lüssen et al.

(10) Patent No.: US 7,289,876 B2
(45) Date of Patent: Oct. 30, 2007

(54) CONTAINER CRANE, AND METHOD OF DETERMINING AND CORRECTING A MISALIGNMENT BETWEEN A LOAD-CARRYING FRAME AND A TRANSPORT VEHICLE

(75) Inventors: Sven Lüssen, Stuhr (DE); Ernst Sparenborg, Delmenhorst (DE); Karl-Heinz Tschierse, Achim (DE); Stephan Wöbse, Kirchlinteln (DE)

(73) Assignee: Siemens Aktiengesellschaft, München (DE)

( * ) Notice: Subject to any disclaimer, the term of this patent is extended or adjusted under 35 U.S.C. 154(b) by 358 days.

(21) Appl. No.: 11/124,417

(22) Filed: May 6, 2005

(65) Prior Publication Data

US 2005/0281644 A1 Dec. 22, 2005

Related U.S. Application Data

(63) Continuation of application No. PCT/DE03/03506, filed on Oct. 21, 2003.

(30) Foreign Application Priority Data

Nov. 7, 2002 (DE) ................................ 102 51 910

(51) Int. Cl.
*G06F 7/00* (2006.01)

(52) U.S. Cl. ...................... 700/213; 700/258; 700/259; 212/275; 212/276; 414/137.1; 414/139.4; 414/139.9; 414/140.3; 414/141.3

(58) Field of Classification Search ................ 700/213, 700/214, 251, 252, 258, 259; 212/275, 276; 414/137.1, 139.4, 139.9, 140.1, 140.3, 141.3, 414/142.6
See application file for complete search history.

(56) References Cited

U.S. PATENT DOCUMENTS

| | | | | |
|---|---|---|---|---|
| 5,491,549 | A | 2/1996 | Wichner et al. | |
| 5,729,453 | A * | 3/1998 | Lee et al. | 701/50 |
| 5,919,022 | A * | 7/1999 | La Coste | 414/137.1 |
| 6,081,292 | A * | 6/2000 | Lanigan et al. | 348/61 |
| 6,124,932 | A * | 9/2000 | Tax et al. | 356/614 |

(Continued)

FOREIGN PATENT DOCUMENTS

DE 198 41 570 3/2000

(Continued)

*Primary Examiner*—Khoi H. Tran
(74) *Attorney, Agent, or Firm*—Henry M. Feiereisen; Ursula B. Day

(57) ABSTRACT

A container crane includes a movable trolley and a load-carrying frame pendantly connected to the trolley and comprised of a spreader and a head block, for transfer of a container from or to a transport vehicle. Plural optical detectors are mounted on the trolley for identifying longitudinal and transversal edges of the head block or spreader and the transport vehicle. Operatively connected to the detectors is a processing device for determining a spatial position of the edges and calculating a position of longitudinal and transversal center lines of the head block or spreader and the transport vehicle and their spatial positions in relation to one another. In this way a possible offset of the center lines of the head block or spreader with regard to those of the transport vehicle in longitudinal and transversal directions as well as a rotation angle of the center lines can be determined, whereby a detected offset or rotation angle is compensated by displacing the spreader relative to the head block.

28 Claims, 5 Drawing Sheets

U.S. PATENT DOCUMENTS

| | | | | |
|---|---|---|---|---|
| 6,256,553 | B1 * | 7/2001 | Erikkila | 700/213 |
| 6,460,711 | B1 * | 10/2002 | Kato et al. | 212/275 |
| 6,466,843 | B1 * | 10/2002 | Bonanni et al. | 700/245 |
| 6,480,223 | B1 * | 11/2002 | Grasmueller | 348/87 |
| 6,648,156 | B1 * | 11/2003 | Bryfors et al. | 212/270 |
| 6,826,452 | B1 * | 11/2004 | Holland et al. | 700/245 |
| 7,106,883 | B2 * | 9/2006 | Uchida et al. | 382/100 |
| 7,123,132 | B2 * | 10/2006 | Heidenback et al. | 340/431 |

FOREIGN PATENT DOCUMENTS

| | | | |
|---|---|---|---|
| DE | 100 23 756 | A | 11/2001 |
| EP | 0 677 478 | A | 10/1995 |
| WO | WO94/05586 | A | 3/1994 |
| WO | WO 00/23347 | A | 4/2000 |

* cited by examiner

CONTAINER CRANE, AND METHOD OF DETERMINING AND CORRECTING A MISALIGNMENT BETWEEN A LOAD-CARRYING FRAME AND A TRANSPORT VEHICLE

CROSS-REFERENCES TO RELATED APPLICATIONS

This application is a continuation of prior filed copending PCT International application no. PCT/DE2003/003506, filed Oct. 21, 2003, which designated the United States and on which priority is claimed under 35 U.S.C. §120, and which claims the priority of German Patent Application, Serial No. 102 51 910.2, filed Nov. 7, 2002, pursuant to 35 U.S.C. 119(a)-(d).

BACKGROUND OF THE INVENTION

The present invention relates, in general, to a container crane, and more particularly to a container crane having a system for determining and correcting a relative position of a load-carrying frame to a transport vehicle.

Nothing in the following discussion of the state of the art is to be construed as an admission of prior art.

A container crane of a type involved here is used for loading and unloading container ships and typically includes a trolley that is movable along a boom and has a hoist mechanism with suspended load-carrying frame, comprised of a spreader and a head block, and for moving a container to and from a transport vehicle. Thus, the container is either unloaded from the ship onto the crane-distal transport vehicle or loaded from the crane-distal transport vehicle onto the ship. Crane constructions are known having only a single trolley for direct transfer of a container from the ship to the transport vehicle, and vice versa, or two separate trolleys, each having its own hoist mechanism. One trolley is hereby referred to as primary trolley and assumes the actual loading and unloading of the ship for placing a container from the ship on a placement area to the side of the crane or for transferring a container from the crane-side placement area to the ship. The other trolley is referred to as gantry trolley and transports the container from the placement area to a crane-distal transport vehicle, or removes the container from the transport vehicle for transfer to the placement area, oftentimes also called reception platform. Current crane installations control the one trolley or both trolleys automatically or at least semi-automatically. Proper loading operation depends especially on the position of a trolley or its load-carrying frame, with or without container, relative to a container to be fetched or relative to a transport vehicle. To achieve a swift loading operation, the load-carrying frame must be precisely and quickly positioned in relation to the container to be grabbed, e.g. on a transport vehicle, so that the load-carrying frame can be placed upon the container and grab the container with its grippers, called flippers. Likewise, positioning during the unloading operation should be executed quickly and precisely, i.e. when a container suspended from the load-carrying frame should be positioned in relation to the transport vehicle and placed thereupon. The alignment of the load-carrying frame, with or without container, in relation to the transport vehicle is oftentimes implemented by the crane operator. Especially, in the case of a two-trolley crane, the crane operator sits substantially vertical above the load-carrying frame in the cab of the gantry trolley, while moving with the gantry trolley, and optically monitors the position of the load-carrying frame in relation to the transport vehicle. Possible positional differences are compensated manually and also undertaken by the crane operator. This course of action is not only imprecise and depends primarily on the competence of the crane operator to recognize a positional difference, e.g. an offset, and to execute proper correction through operation of the lifting gear or the running gear, but is also time-consuming, thus adversely affecting the container transshipment.

It would therefore be desirable and advantageous to provide an improved container crane to obviate prior art shortcomings.

SUMMARY OF THE INVENTION

According to one aspect of the present invention, a container crane includes a boom, a trolley movable along the boom, a hoist mechanism connected to the trolley and having suspended therefrom a load-carrying frame, comprised of a spreader and head block, for moving a container to and from a transport vehicle, an optical detection device arranged on the trolley for identifying longitudinal and transverse edges of the head block or spreader and of the transport vehicle, a processing unit operatively connected to the detection device and constructed to ascertain a spatial disposition of the longitudinal and transverse edges, calculate a position of longitudinal and transverse center lines of the head block or spreader as well as of the transport vehicle, as well as their spatial disposition, and determine the presence of an offset between the longitudinal and transverse center lines of the head block or spreader and the center lines of the transport vehicle, and/or the presence of a rotation angle of the longitudinal and transverse center lines, and an adjustment assembly acting between the head block and the spreader, wherein the adjustment assembly is operated in response to the offset or rotation angle to compensate the offset or rotation angle by moving the spreader in relation to the head block.

The present invention resolves prior art problems by constructing a container crane which allows a fully automated alignment of the load-carrying frame, e.g. head block or spreader, with or without container, in relation to the transport vehicle. This is realized by securely fixing the optical detection device to the trolley so that the detection device is conjointly moved with the trolley and is able to monitor the load-carrying frame suspended from the trolley and to detect the edges of the transport vehicle after positioning of the trolley above the transport vehicle. Based on the detected edges, the respective longitudinal and transverse center lines as well as their spatial disposition in relation to one another are determined. The spatial disposition is then used to identify a possible offset of the transverse center line of the load-carrying frame in relation to the transverse center line of the transport vehicle and of the longitudinal center line of the load-carrying frame in relation to the longitudinal center line of the transport vehicle. In addition, a rotation angle of the center lines relative to one another can be determined. Once an offset or rotation angle is identified, the relative position becomes apparent between the load-carrying frame and the container on the transport vehicle, and the relative position between the container on the spreader and the transport vehicle. This assumes that the container is positioned exactly edge-parallel on the transport vehicle and that the container is precisely positioned on the spreader. In other words, the center of the load-carrying frame, as defined by the respective center lines coincides with center of the container, and the center of the transport vehicle coincides with the center of the container placed upon the transport vehicle.

When an offset or rotation angle is known, the spreader can be shifted relative to the head block by a suitable adjustment mechanism, primarily adjustment cylinders, operated by a control unit. In other words, the spreader is slightly moved lengthwise and/or transversely and/or turned relative to the head block to compensate the offset or rotation angle as detected through a comparison of the center lines. The edge detection and determination of an offset or rotation angle takes place immediately after the trolley has been positioned above the transport vehicle. In other words, the position of the load-carrying frame is rapidly verified and a misalignment is respectively corrected. Any positional inaccuracy can be quickly identified and corrected in a fully automated manner because edge detection and determination of the offset or rotation angle takes place automatically as is the adjustment of the spreader relative to the head block with the assistance of the suitable control unit which receives respective data with respect to offset or rotation angle from the processing unit.

According to another feature of the present invention, an offset of the longitudinal and transverse center lines can be determined on the basis of an offset between an intersection of the center lines of the longitudinal and transverse center lines of the load-carrying frame and an intersection of the longitudinal and transverse center lines of the transport vehicle. In the event of an offset in x direction or y direction only, the longitudinal and transverse center lines of the load-carrying frame would be shifted parallel relative to the longitudinal and transverse center lines of the transport vehicle and spaced from one another. In this case, the offset can be determined simply by the relative courses of the transverse center lines and of the longitudinal center lines. However, in most cases a slight rotation is also encountered so that a comparison of the center line intersection of the individual systems is sufficient in order to determine an offset. A rotation angle can be determined again by the relative position of the longitudinal and transverse center lines to one another.

According to another feature of the present invention, the detection device may include a plurality of detectors in the form of cameras. Cameras take images of subjacent regions, i.e. of the load-carrying frame and the transport vehicle, which images are then evaluated by the processing unit configured as an image processing unit which is constructed for edge detection and operatively connected to the cameras. The image processing unit contains appropriate software for detecting in the image an edge of the load-carrying frame as well as of the transport vehicle, and for determining their spatial disposition to thereby allow conclusion about respective operating data and the offset/rotation angle.

As an alternative, the detection device may include a plurality of detectors in the form of laser scanners whereby each laser scanner emits a moving and scanning laser beam in the direction of the load-carrying frame and the transport vehicle and evaluates the reflective light to produce corresponding signals. The laser scanners are operatively connected to a signal processing device constructed for processing the signals generated by the laser scanners for edge and/or line determination as well as offset determination. In other words, reflective signals are processed for edge or line determination.

A precise determination of the edge course as well as the spatial disposition can be realized by mounting the cameras or laser scanners to the trolley such that different regions of the spreader or head block of the load-carrying frame as well as of the transport vehicle are recorded and scanned. In other words, image information or signal information about the edge can be received from different regions of the load-carrying frame and transport vehicle so as to realize a precise determination of relevant edge-based parameter. Suitably, the detection device includes four cameras in spaced-apart disposition on the trolley, or four laser scanners in spaced-apart disposition on the trolley. Of course, more than four cameras or laser scanners may be provided as well, although the arrangement of four cameras or laser scanners is adequate to scan a large enough area so as to attain a sufficiently accurate edge detection and allow calculation of a potential offset or rotation angle.

According to another feature of the present invention, the cameras or laser scanners may be arranged at an angle to a vertical. In other words, the cameras or laser scanners are not aligned vertically from above downwards but are skewed in relation to the vertical so that the load-carrying frame and the transport vehicle are recorded from one side. This angle, also called pitch angle or roll angle, is only few degrees, primarily about 8°.

The detectors, i.e. cameras or laser scanners, may be arranged on the trolley in two different planes. In other words, some of the cameras or laser scanners are positioned higher than others. The detectors may be arranged on one side of the trolley, or on both sides of the trolley. When using, for example, four detectors, these detectors are arranged in one line, optionally at different planes. An arrangement with two detectors on each side is, of course, also conceivable, whereby the detectors are then positioned in a same plane.

According to another feature of the present invention, the processing unit may be constructed for determining a tilt of the transport vehicle in relation to a horizontal plane. This is especially opportune, when, for example, a tire of the transport vehicle is flat or the tire pressure is too low so that the support surface of the transport for a container is slightly inclined. As a result, the disposition of the edge and thus the course of the center lines change, whereby the extent of the change depends on the size of the tilt angle. A potential error resulting from a tilt can thus be recognized and corrected. A tilt of the transport vehicle may, of course, also be caused by an uneven ground. If a possible skew is known, the load center, i.e. the center of the load-carrying frame and thus also of an pendantly connected container, can be corrected by the skew in length and transverse directions in relation to the center of the transport vehicle as well as a possible angle between the length and/or transverse lines.

Determination of a possible tilt of the transport may be realized by constructing the processing unit for recognizing planar surfaces of the transport vehicle and its spatial disposition as well as for determining a tilt of the transport vehicle on the basis of the disposition of the surface. During image recordation by the cameras or scanning by the laser scanners, the planar transport vehicle surfaces, such as the support surface or a vertical sidewall of the transport vehicle, are necessarily detected. The respective processing unit is thus able to recognize from the given information, i.e. image data or scanner signals, also the spatial surface disposition and thereby to determine whether a sidewall of the transport vehicle is slightly tilted for example and, if affirmative, the direction and the degree in relation to the vertical of the tilt. In other words, the overall tilt in a particular direction of the transport vehicle can be determined.

According to another feature of the present invention, each laser scanner may be constructed to radiate a laser beam in a cone-beam shape at a beam angle between 2° and 8°, especially 4°. The laser scanners are positioned relatively high, as the trolley travels at a height of greater than 20 m, so that a large enough scanning area of the load-carrying frame is realized, when the load-carrying frame is quasi lowered through the cone-beam radiation, and of the transport vehicle at ground level. This ensures a continuous detection of the transverse and longitudinal edges of the load-carrying frame and the transport vehicle. Likewise, when cameras are used as detectors, the cameras can be constructed to establish also a large enough recording area.

According to another feature of the present invention, a tilt sensor may be operatively connected to the processing unit for determining a tilt of the boom, whereby the processing unit is constructed to take into account the tilt of the boom when determining the presence of an offset between the longitudinal and transverse center lines of the head block or spreader and the longitudinal and transverse center lines of the transport vehicle, as well as the presence of a rotation angle of the center lines. The boom, along which the trolley travels, may tilt over time so that the trolley will no longer travel precisely in the horizontal plane but along a respectively inclined track. As a result, the detectors tilt as well and record the transverse and longitudinal edges at an angle which deviates from the original calibration. In other words, the calculation of the disposition of the transverse differs. By using the tilt sensor, a possible tilt of the boom and of the detectors can be detected and suitably compensated.

According to another feature of the present invention, a control unit may be provided to communicate with the processing unit and to provide information about a load state of the spreader and of a container that has been picked up. The processing unit is constructed to take into account this information, when determining the presence of an offset and/or rotation angle. In this way, the size of the container and the extent by which the spreader needs to be moved apart or has been moved apart in order to grasp the container can be ascertained. Typically, only three types of standardized containers are used, whereby the container type is inputted into the processing unit. Known types involve 20" container, 40" container, and 45" container. These data are also used by the detectors and the processing unit to survey the container sides to determine the container bottom side, when the container is already pendant from the load-carrying frame, or the container top side, when the container rests on the transport vehicle, and thus to verify the distance between the load-carrying frame and the transport vehicle.

According to another feature of the present invention, a control unit may be provided to control a hoisting operation of the trolley, whereby the control unit provides information about a lifting height of the head block or the spreader and communicates with the processing unit such that the processing unit considers the information upon determination of the possible offset and/or rotation angle. On the basis of the actual height, the processing unit is able to determine at which height information can be expected about the head block or spreader edges. By using a filter, furnished image data or image signals from the detectors, can be filtered to suppress image data artifacts or signal artifacts in dependence on the lifting height of the head block or the spreader. For example, when an image data artifact or signal artifact indicates the presence of an edge in a region above the actual lifting height of the head block, the indication of the edge can be ignored or simply interpreted as an error that does not require any further processing. In other words, a data or signal filtering measure is provided that allows elimination of error interpretations in a simple manner.

According to another feature of the present invention, a control unit may be provided for controlling travel operation of the trolley and can be so constructed as to move the trolley initially to a defined position above the transport vehicle before the processing unit determines the presence of an offset and/or rotation angle. The control unit thus initially positions the trolley relative to the transport vehicle. Of course, several transport vehicles may be arranged behind one another in several tracks, whereby the control unit is operated to direct the trolley to the selected transport vehicle for subsequent execution of the actual position check and possible corrective measures.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
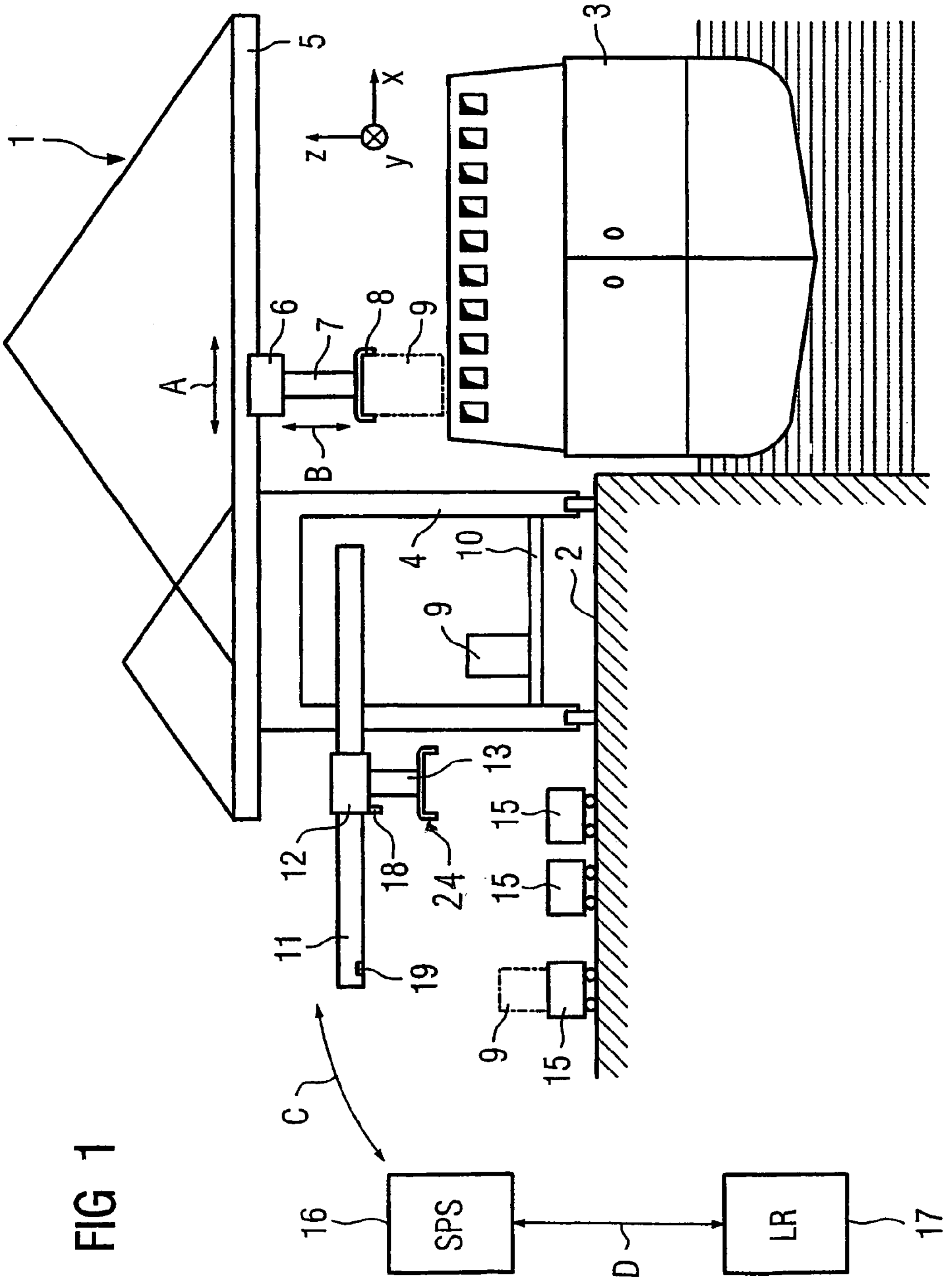
FIG. 1 is a principal illustration of a container crane according to the present invention in the form of a two-trolley container bridge.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a principal illustration of a container crane according to the present invention in the form of a two-trolley container bridge, generally designated by reference numeral 1 and moveable by a traveling gear along a quay wall 2 in length direction of a container ship 3. The container crane 1 includes a crane base 4 for support of a boom 5 which is sized to fully span across the width of the ship 3. A trolley 6, representing the primary trolley, is mounted to the boom 5 for travel along the boom 5 as indicated by double arrow A and carries via lifting cables 7 a container spreader 8 which, as shown by way of example in FIG. 1, grabs a container 9, shown by broken lines. The spreader 8 is suspended from the lifting cables 7 and displaceable vertically by means of a trolley-side hoist mechanism, as indicated by arrow B.

The container crane 1 is intended to transfer the container 9 onto a placement area 10, when being unloaded from the ship 3. The placement area 10, also called reception platform, is sized to receive several containers 9. As shown by way of example in FIG. 1, a further container 9 has already been positioned by the trolley 6 on the placement area 10.

The container crane 1 further includes a second boom 11 on which a second trolley 12, representing a gantry trolley, is arranged for movement. A load-carrying frame, generally designated by reference numeral 24, is pendantly connected to the trolley 12 via lifting cables 13 and includes a container spreader 14 and a head block 20 whereby an unillustrated adjustment mechanism, e.g. adjusting cylinders, is disposed between the spreader 14 and the head block 20 for moving the spreader 14 relative to the head block 20 for a purpose to be described hereinafter. The trolley 12 and the spreader 14 have also access to the placement area 10 so as to be able to transfer a container 9 from the placement area 10 to a transport vehicle 15 positioned to the side of the crane base 4. Three transport vehicles 15 are shown by way of example in FIG. 1, with the left-most transport vehicle 15, e.g. a railway car or driverless transport vehicle, being loaded with a container 9, shown by broken lines.

Loading and unloading takes thus place in two stages. Unloading involves removal of a container 9 from the ship 3 by the trolley 6 which transfers the container 9 to the placement area 10. This container 9 is then picked up by the trolley 12 from the placement area 10 and transferred to a transport vehicle 15. The loading process of a container 9 onto a ship 3 is realized in reverse order.

Loading and unloading operations by the container crane 1 can be controlled semi-automatically or can be fully automated, including also the travel of the trolleys 6, 12 and the lifting operation of the spreaders 8, 14, by a stored-program control unit (SPS) 16 which is provided on the container crane 1. A bidirectional data communication is involved here between the traveling gears and hoist mechanisms and other relevant operating elements and the control unit 16, as indicated by double arrow C. Loading and unloading requires the provision of particular container-specific assignments which relate to certain data for identification of the container and instructions as to which further actions should be undertaken for the container. These data are processed in the control unit 16 which controls the operation of the container crane 1, i.e. the trolley operation and hoist mechanism, in dependence on the data.

The assignment data are transmitted to the control unit 16 via a master computer (LR) 17 which is positioned at a crane-distal location and communicates bidirectionally with the control unit 16, as indicated by double arrow D. The assignment data includes information to identify, for example, the container to be fetched by the trolley 6 as well as the position of the container on the ship 3, or to indicate the destination to which the trolley 12 is supposed to transfer the container with respect to several available placement locations of different transport vehicles, or from where the container is to be fetched.

In order to realize a precise positioning of the trolley 12 and its load-carrying frame 24, comprised of the spreader 14 and the head block 20, in relation to a transport vehicle 15, the trolley 12 includes a detection device having a plurality of detectors 18 in the form of cameras or laser scanners. For sake of simplicity, only one detector 18 is shown in FIG. 1. The detection device is provided to identify, on one hand, the load-carrying frame 24, pendantly connected to the underside of the trolley 12, and, on the other hand, the transport vehicle 15, once the trolley 12 has been positioned above the selected transport vehicle 15, and then to determine and evaluate the spatial disposition of transverse and longitudinal edges of the head block 20 as well as of the transport vehicle 15 for identification of potential offsets (skewing) or rotation angles.

For a purpose to be described furtherbelow, the container crane 1 is further provided with a tilt sensor 19 which is mounted to the boom 11 to identify a possible tilt of the boom 11 in relation to a horizontal plane, and thus a possible tilt of the trolley 12.

Figure 2:
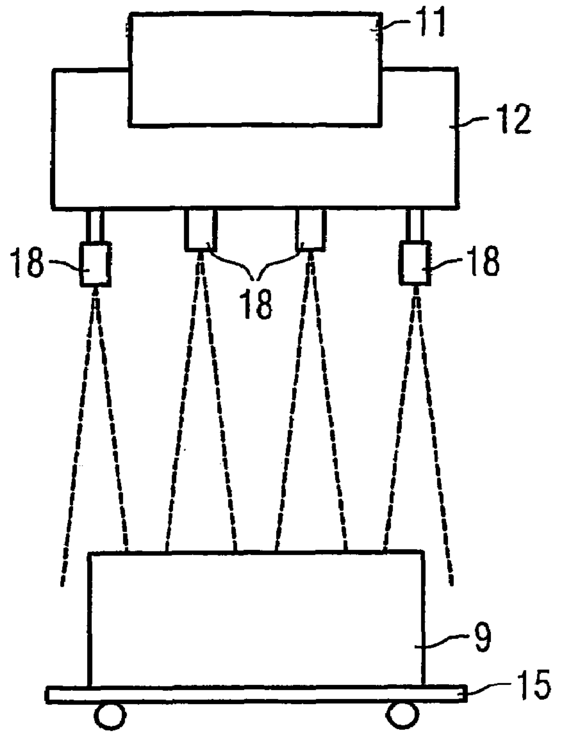
FIG. 2 is a schematic side view of a gantry trolley to show a basic arrangement of detectors.

Referring now to FIG. 2, there is shown a schematic side view of the trolley 12 to show a basic arrangement of the detectors 18, whereby only those parts of the container crane 1 that are necessary for the understanding of the present invention are shown for the sake of simplicity. The trolley 12, which is arranged on the boom 11, has attached thereto four detectors 18 arranged at two different planes, whereby the two outer detectors extend at a same level at a lower plane than the two inner detectors 18 which area also arranged at a same level. The detectors 18 are disposed in alignment transversely to the travel direction of the trolley 12. In the example of FIG. 1, each detector 18 is constructed as a laser scanner with a rotary measuring laser beam which is deflected by a rotating prism at an angle of 4° with respect to the vertical. This generates a conical scanning beam to scan a circle of a radius which expands as the distance of the laser scanner 18 increases. The detectors 18 are suitably located at a height of ≧20 m, typically of about 24 m above ground.

A cone angle of 4° and a distance of about 20 m from the prism lead to a circular cone with a base diameter of about 2.8 m, without consideration of a pitch angle and yaw or roll angle. The prism advantageously rotates at angular increments of 0.25°. Thus, a revolution is subdivided in 1440 positions. In other words, each revolution results in 1440 measurements. The laser scanners 18 are configured hereby to measure in addition to the angle also the distance of the point from which the laser beam is reflected.

Figure 3:
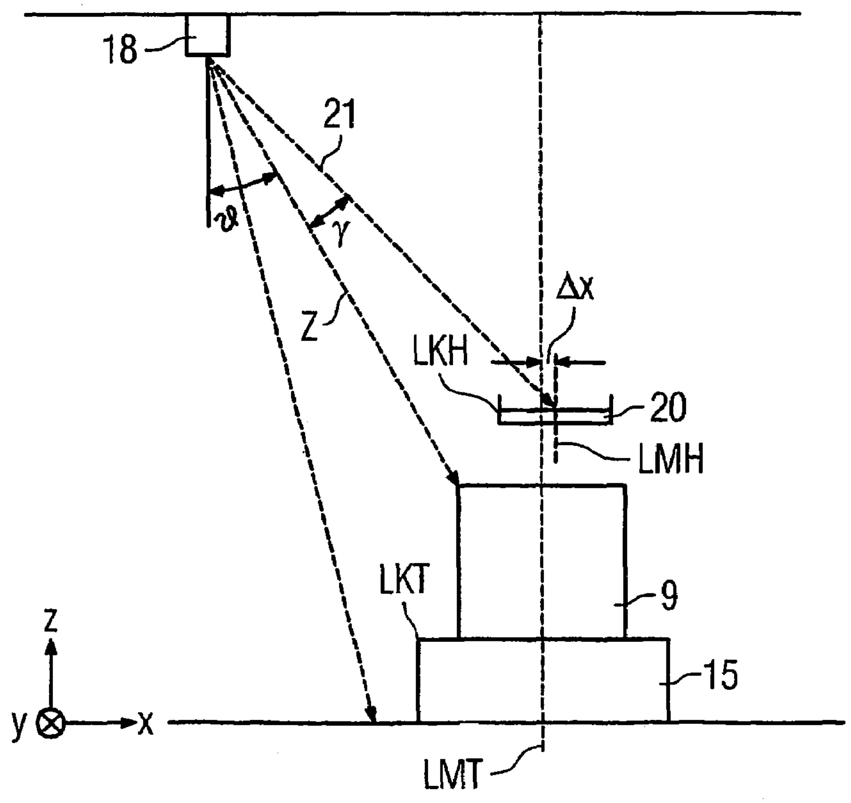
FIG. 3 is a schematic front view onto the trolley to show a basic scanning direction of the detectors upon a transport vehicle with deposited container.
Figure 4:
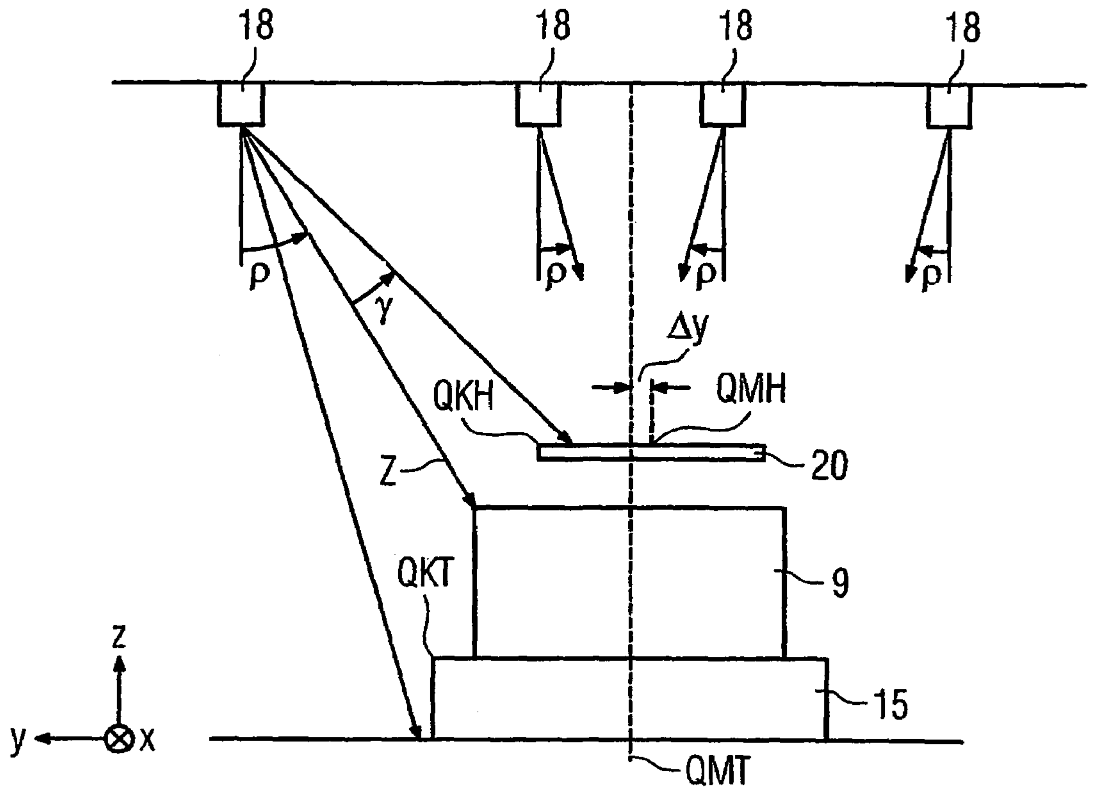
FIG. 4 is a schematic illustration as viewed in length direction of the trolley to show the scanning direction of the detectors upon the transport vehicle, load-carrying frame, and container.

The precise arrangement and alignment of the detectors 18 in the form of laser scanners is illustrated in FIGS. 3 and 4, with FIG. 3 showing the basic scanning direction of the detectors 18 by way of a front view onto the trolley 12, and with FIG. 4 showing the basic scanning direction of the detectors 18 by way of view in length direction of the trolley 12. FIGS. 3 and 4 show hereby a transport vehicle 15 with placed container 9 and the head block 20 of the load-carrying frame 24 supported by the unlabeled trolley 12. A detector 18 in the form of a laser scanner is shown here fixedly suspended from the trolley 12. The laser scanner 18 emits a conical laser beam defined by a beam angle $\gamma$ of about 4°. The laser beam emitted by the laser scanner 18 is tipped in relation to its center beam Z, which defines the cone center, by a pitch angle $\theta$ in x-direction. This pitch angle is about 8° and is the same for all laser scanners 18.

In addition, each laser scanner 18 is also tipped about a roll angle ρ relative to the center beam Z in y-direction, as illustrated in FIG. 4. The roll angle ρ of the two outer laser scanners 18 is hereby about 6°, and about 4° for the inner laser scanners 18.

FIGS. 3 and 4 also depict the edges to be identified and the parameter to be determined. With respect to the transport vehicle 15, the longitudinal edge LKT and the transverse edge QKT are to be identified, and with respect to the load-carrying frame 24, the longitudinal edge LKH and the transverse edge QKH of the head block 20 are to be identified. The distance between both longitudinal edges LKT and LKH defines a variable to be measured which is commensurate with the relative distance between the head block edge to the transport vehicle edge in transverse direction. Likewise the distance between both transverse edges QKT and QKH defines a variable to be measured which is commensurate with the relative distance between the head block transverse edge to the transport vehicle transverse edge in length direction. The actual variable to be determined, i.e. the offset of the center lines of the head block 20 to the center lines of the transport vehicle 15 can then be calculated by the relative position of the longitudinal and transverse edges. In other words, the offset of the longitudinal center line LMH of the head block 20 to the longitudinal center line LMT of the transport vehicle 15, and the offset of the transverse center line QMH of the head block 20 to the transverse center line QMT of the transport vehicle 15 can be determined.

Determination of the respective offsets and also of a possible rotation angle is thus possible by scanning the edges of the transport vehicle 15 and the head block 20 with the assistance of the detectors 18.

Figure 5:
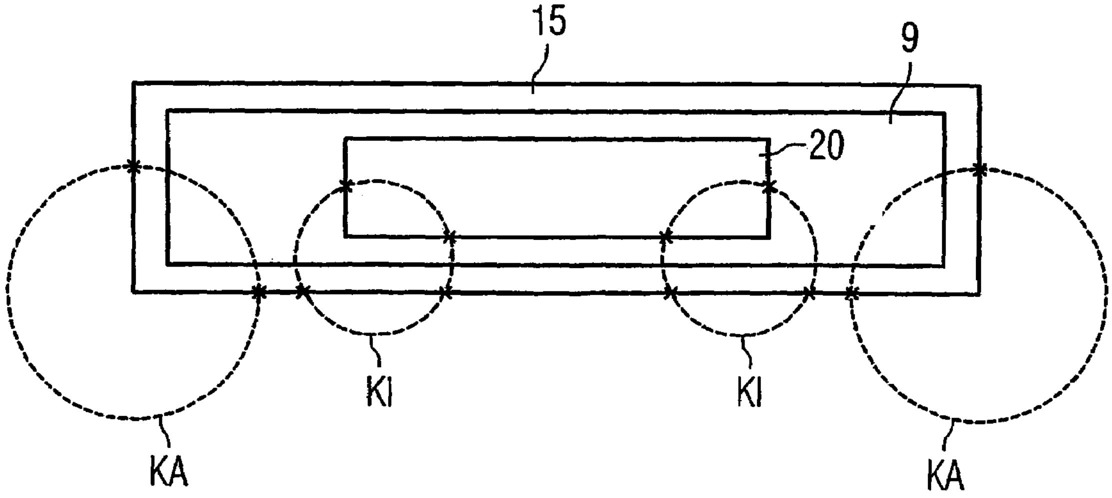
FIG. 5 is a schematic illustration of scanning or recording zones of the detectors of the head block and transport vehicle.
Figure 7:
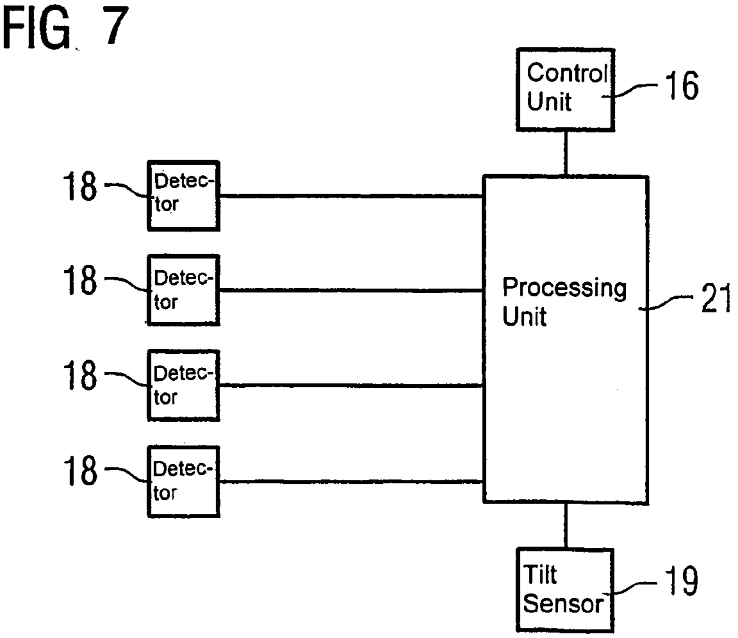
FIG. 7 is a schematic block diagram to show a communication between the detectors, processing unit and a central control unit.

FIG. 5 shows a schematic illustration of the scanning zones during scanning operation by the detectors 18 of the head block 20 (spreader 14 is not shown here for ease of illustration) and the transport vehicle 15. Outer circles KA relate to the outer laser scanners 18 whereas the inner circles KI relate to the inner laser scanners 18. As marked by the crosses, a plurality of edge-based measuring values or scanning positions is realized. The signals generated by the laser scanners 18 in response to the measurement are sent to a processing unit 21, as shown in FIG. 7. The processing unit 21 contains suitable signal processing software to allow determination of the course of the longitudinal and transverse edges of the transport vehicle 15 and the head block 20 on the basis of the individual scanner-specific signals. The course of the longitudinal edges LKT, LKH can easily be determined because of the presence of several edge positions. As the transverse edges QKT, QKH extend perpendicular to the longitudinal edges LKT, LKH, the position of the transverse edges QKT, QKH is also easy to acquire. The head block 20 and the transport vehicle 15 have each fixed dimensions so that the spatial position of the head block 20 and the transport vehicle 15 can also easily be ascertained. In order to produce proper results, the processing unit 21 further receives information from the tilt sensor 19 about a possible boom tilt as well as information from the central control unit 16 about the load situation of the head block 20 and the container 9 which is to be fetched or deposited.

Figure 6:
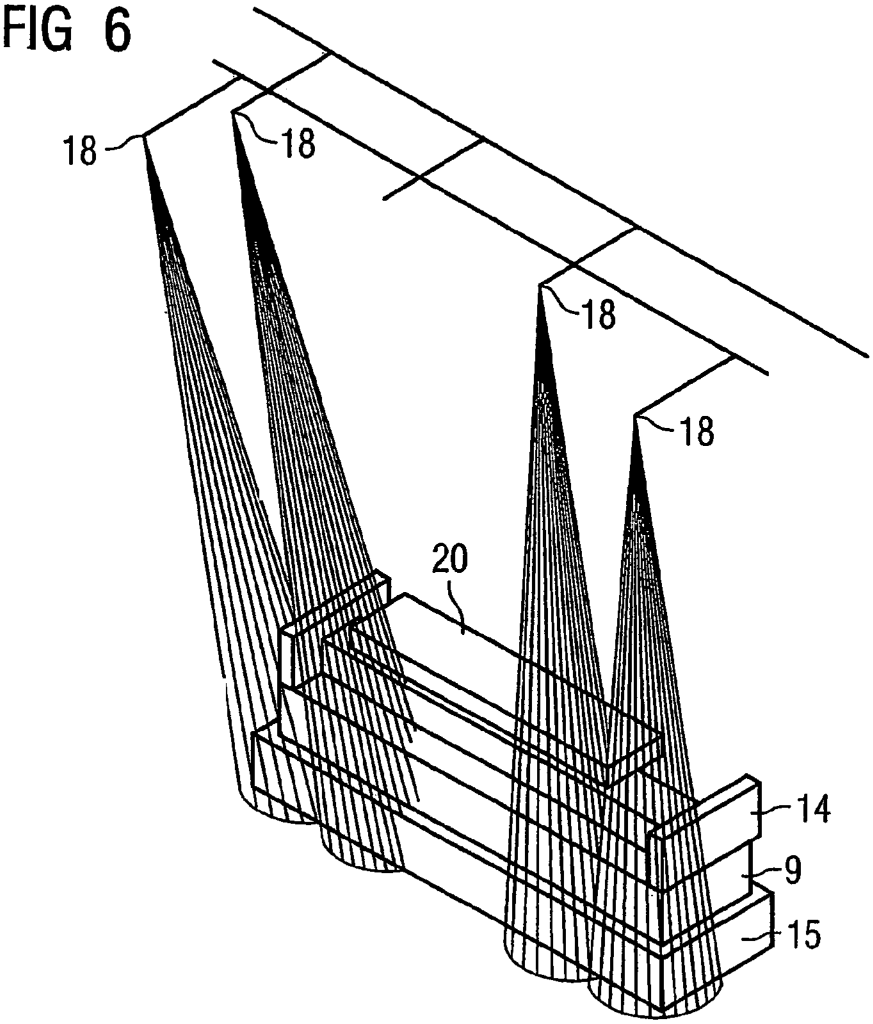
FIG. 6 is a perspective illustration of basic scanning zones.

FIG. 6 shows a perspective illustration of the basic scanning zones, as shown in FIG. 5. Thus, the laser scanners 18 emit conical laser beams for scanning the transport vehicle 15 with container 9, and the load-carrying frame 24, comprised of the head block 20 and the spreader 14.

Figure 8:
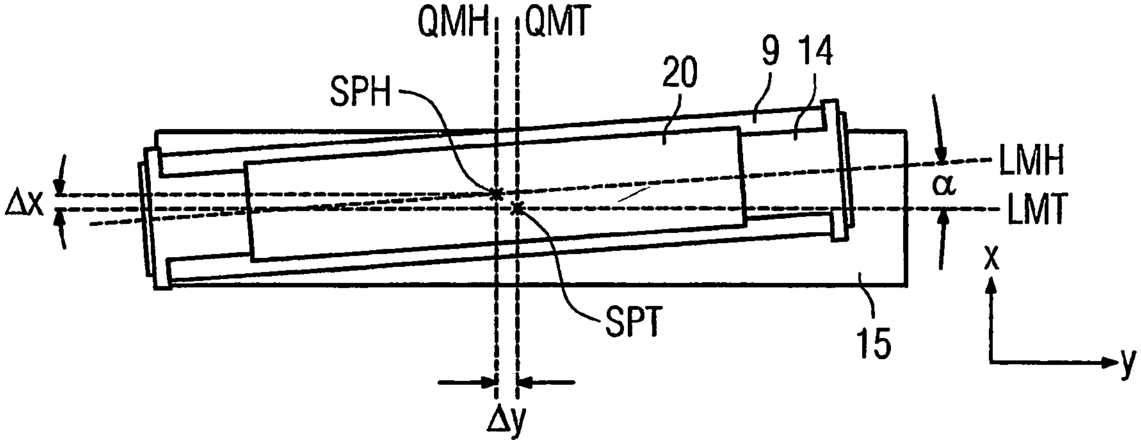
FIG. 8 is a schematic plan view of the load-carrying frame in skewed relation to the transport vehicle for depicting offsets as well as a rotation angle.

Referring now to FIG. 8, there is shown a schematic plan view of the load-carrying frame 24 in skewed relation to the transport vehicle 15 for depicting offsets as well as a rotation angle. As described above, the longitudinal edges LKT, LKH and the transverse edges QKT, QKH of the transport vehicle 15 and the head block 20 are identified by the detectors 18, which may be laser scanners or cameras, to determine their courses as well as their spatial relationships. As the dimensions of the transport vehicle 15 and of the head block 20 are known, the respective center lines in longitudinal and transverse directions can be calculated. In other words, the longitudinal center line LMT and the transverse center line QMT of the transport vehicle 15 and the longitudinal center line LMH and the transverse center line QMH of the head block 20 can be determined. Offsets in x and y directions as well as a rotation angle α can thus be calculated on the basis of these longitudinal center lines LMT, LMH and transverse center lines QMT, QMH. This is shown in FIG. 8.

Possible offsets in x and y directions are calculated on the basis of respective intersections of the longitudinal and transverse center lines of the head block 20 and the transport vehicle 15. The intersection of the center lines LMH and QMH of the head block 20 is designated by reference character SPH, whereas the intersection of the center lines LMT and OMT of the transport vehicle 15 is designated by reference character SPT.

As shown in FIG. 8, the intersections SPH and SPT do not coincide, which indicates the presence of an offset in x and/or y direction. In the example of FIG. 8, there is an offset in both directions, i.e. offset Δx in x direction, and offset Δy in y direction.

In corresponding manner, the rotation angle α is calculated on the basis of the center lines of the head block 20 and the transport vehicle 15. In the example of FIG. 8, the rotation angle α is calculated on the basis of the angle between the longitudinal center line LMH of the head block 20 and the longitudinal center line LMT of the transport vehicle 15. It is hereby assumed that the head block 20 occupies a correct position whereas the transport vehicle 15 is skewed.

After determination of the offsets Δx, Δy and the rotation angle α, operation of the unillustrated adjustment mechanism, e.g. adjusting cylinders, acting between the head block 20 and the spreader 14, is initiated to correct the offset(s) and the rotation angle α. The adjustment mechanism moves and turns the spreader 14 in relation to the head block 20, which is substantially fixed in place, thereby realigning the spreader 14 in relation to the edges of the transport vehicle 15 and to thereby realign the transport vehicle 15 itself. The container 9, suspended from the spreader 14, is lowered (load run) onto the transport vehicle 15, whereby it is assumed that as a result of the geometric dimensions, the center of the head block 20 coincides with the load center, i.e. spreader 14 with container 9. In other words, when the head block center is realigned in relation to the center of the transport vehicle 15 through compensation of a possible offset/rotation angle, the container 9 on the spreader 14 is automatically in correct alignment with respect to the transport vehicle 15.

When a container 9 on a transport vehicle 15 is picked up (idle run), the head block 20 and the transport vehicle 15 are again surveyed. As a result of the geometric measurements of the transport vehicle 15, the container 9 can only be supported on the transport vehicle 15 within narrow limits of e.g. few millimeters. It is assumed that the container center corresponds to the center of the transport vehicle. Realignment of the center of the head block 20 in relation to the center of the transport vehicle 15 ensures also in this situation that the spreader center is correctly positioned with respect to the container center so that the container 9 can be fetched in a precise manner.

Figure 9:
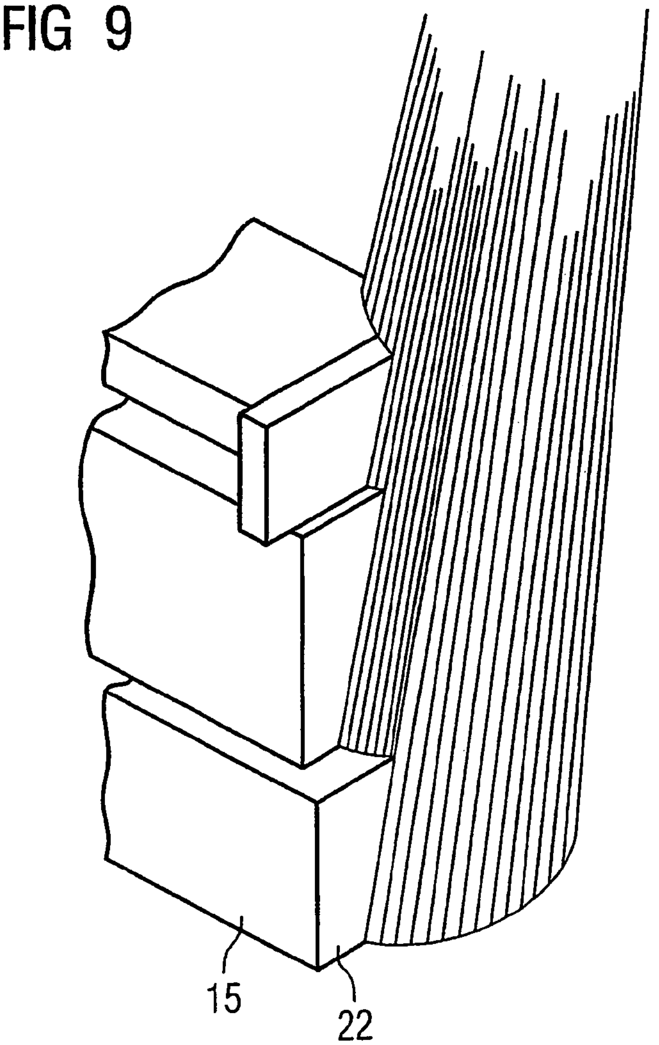
FIG. 9 is a schematic principal illustration of a scanning operation upon the transport vehicle.

FIG. 9 shows a schematic principal illustration of the laser beam to scan sidewalls of the transport vehicle 15 in particular. The rotating laser beam thus scans a side surface 22 of the transport vehicle 15 and sends commensurate information to the processing unit 21 which determines the spatial disposition of this side surface 22 and identifies any tilt of the side surface 22 of the transport vehicle 15 relative to the vertical. In this way, possible uneven terrain or a flat tire or the like, which results in a tilt of the placement area 10 of the transport vehicle 15 and of a supported container 9, can be detected. Detection of a possible tilt can thus be taken into account, using proper software in the processing unit 21, when scanning the edges and thus the center lines of the head block 20 and the transport vehicle 15.

As described above in connection with FIG. 7, the processing unit 21 communicates with the central control unit 16 and receives information from the control unit 16 about the container 9, which has been picked up or is being picked up. Information may, for example, include the height of the container 9. Also information about the load state of the spreader 14 can be inputted into the processing unit 21, i.e. whether or not the spreader 14 has already grabbed a container. Other information that is inputted in the processing unit 21 involves the lifting height of the head block 20 or the spreader 14 so that the processing unit 21 has information about the altitude of the head block 20. This information is used to filter out measuring values which erroneously indicate or presume the presence of e.g. an edge during signal evaluation, when the detectors 18 are laser scanner, or image data evaluation, in the event the detectors 18 are cameras. When knowing the lifting height, the plane and thus the height area is known within which relevant measuring values must occur. Measuring values or image data outside this range are ignored, even though the presence of edges may be indicated. This measuring value range, within which filtering takes place, may also be predefined. For example, the actual measurement may be executed only when the head block 20 is positioned at a certain distance to the container top upon fetching a container 9 from the transport vehicle 15, or upon placement of a container 9 upon the transport vehicle 15, when the container bottom is positioned at a certain distance to the top of the transport vehicle 15. This maximum distance, that defines the range where actual position verification can occur, may be about 1 meter. In other words, a window is defined for the head block 20 within which the edges of the head block 20 can lie. For example, the following parameters may be assumed: height of 2 meters for the transport vehicle 15, height of 2.5 meters for the container, maximum distance 1 meter, height of 1 meter for the spreader 14, height of 1 meter for the head block 20. Addition of these parameters results in a maximum height of 7.5 meters. Thus, when the head block 20 is situated at a height of 7.5 meters above ground, filtering takes place up to the instant when the head block 20 has been lowered by a meter (=maximum distance) to fetch the container 9, or to place the container 9 upon the transport vehicle 15. Determination of the lifting height to define the initiation of the filtering operation depends ultimately on the container height that is supplied by the control unit 16 to the processing unit 21.

When the processing unit 21 has identified an offset or a rotation angle, the relevant data are sent to the control unit 16 for operation of the adjustment mechanism to initiate the corrective steps. The compensation is continuously monitored and verified as the detection device continuously identifies the edges and the processing unit 21 continuously determines the offset(s) as well as rotation angle. Verification involves a control as to whether the operation of the adjustment mechanism, as initiated by the control unit 16, actually results in a proper compensation through a check as to whether the previously determined offset(s) or rotation angle decreases and the spreader 14 has shifted into alignment with the center of the transport vehicle 15.

A container crane 1 according to the present invention allows simple supervision of the relative position between the load on the trolley 12 and the transport vehicle 15 by identifying the relative position of the load center to the center of the transport vehicle 15. In other words, the relative distance between the outer edge of the head block 20 and the outer edges of the transport vehicle 15 are surveyed, and, with consideration of head block and transport vehicle tolerances, the center of the transport vehicle 15 is calculated on the basis of the position of the outer edges of the transport vehicle 15 and the center of the head block 20 is calculated on the basis of the position of the outer edges of the head block 20. This process is carried out during lowering of the load or pickup of the load. In response to a determination of offset/rotation angle, corrective steps can be executed fully automatically to compensate for the offset/rotation angle by moving the spreader 14 relative to the head block 20.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A container crane, comprising:

a boom;

a trolley movable along the boom;

a hoist mechanism connected to the trolley and having suspended therefrom a load-carrying frame, comprised of a spreader and head block, for moving a container to and from a transport vehicle;

an optical detection device arranged on the trolley for identifying longitudinal and transverse edges of the head block or spreader and of the transport vehicle;

a processing unit operatively connected to the detection device and constructed to ascertain a spatial disposition of the longitudinal and transverse edges, calculate a position of longitudinal and transverse center lines of the head block or spreader as well as of the transport vehicle, as well as their spatial disposition, and determine the presence of an offset between the longitudinal and transverse center lines of the head block or spreader and the center lines of the transport vehicle, and/or the presence of a rotation angle of the longitudinal and transverse center lines, and an adjustment assembly acting between the head block and the spreader, wherein the adjustment assembly is operated in response to the presence of an offset or rotation angle to compensate the offset or rotation angle by moving the spreader in relation to the head block.

2. The container crane of claim 1, wherein the offset of the longitudinal and transverse center lines is determined on the basis of an offset between an intersection of the center lines of the longitudinal and transverse center lines of the head block or spreader and an intersection of the longitudinal and transverse center lines of the transport vehicle.

3. The container crane of claim 1, wherein the detection device includes a plurality of detectors constructed as cameras.

4. The container crane of claim 1, wherein the detection device includes a plurality of detectors constructed as laser scanners.

5. The container crane of claim 3, wherein the processing unit includes an image processing device constructed for edge detection and operatively connected to the cameras.

6. The container crane of claim 4, wherein the processing unit includes a signal processing device operatively connected to the laser scanner and constructed for processing signals generated by the laser scanners for edge and/or line determination as well as offset determination.

7. The container crane of claim 1, wherein the detection device is mounted to the trolley such that different regions of the head block or spreader as well as of the transport vehicle are checked.

8. The container crane of claim 7, wherein the detection device includes four cameras in spaced-apart disposition on the trolley for recording the regions of the head block or spreader and the transport vehicle.

9. The container crane of claim 7, wherein the detection device includes four laser scanners in spaced-apart disposition on the trolley for scanning the regions of the head block or spreader and the transport vehicle.

10. The container crane of claim 7, wherein the detection device is arranged at an angle to a vertical.

11. The container crane of claim 10, wherein the angle is 8°.

12. The container crane of claim 1, wherein the detection device includes a plurality of detectors arranged on the trolley in two different planes.

13. The container crane of claim 1, wherein the detection device includes a plurality of detectors arranged on one side of the trolley.

14. The container crane of claim 1, wherein the detection device includes a plurality of detectors arranged on both sides of the trolley.

15. The container crane of claim 1, wherein the processing unit is constructed for determining a tilt of the transport vehicle in relation to a horizontal plane.

16. The container crane of claim 1, wherein the processing unit is constructed for recognizing a planar surface of the transport vehicle and its spatial disposition as well as for determining a tilt of the transport vehicle on the basis of the disposition of the surface.

17. The container crane of claim 4, wherein the laser scanners are constructed to radiate a laser beam in a cone-beam shape at a beam angle between 2 and 8°.

18. The container crane of claim 17, wherein the beam angle is 4°.

19. The container crane of claim 1, further comprising a tilt sensor, operatively connected to the processing unit, for determining a tilt of the boom, said processing unit being constructed to consider the tilt of the boom upon determination of the presence of a potential offset and/or the presence of a potential rotation angle.

20. The container crane of claim 1, further comprising a control unit communicating with the processing unit and providing information about a load state of the spreader and of a container that has been picked up or is to be picked up, said processing unit being constructed to consider the information upon determination of the presence of a potential offset and/or the presence of a potential rotation angle.

21. The container crane of claim 1, further comprising a control unit operated to control a hoisting operation of the trolley, said control unit providing information about a lifting height of the head block or spreader and communicating with the processing unit such that the processing unit considers the information upon determination of the presence of a potential offset and/or the presence of a potential rotation angle.

22. The container crane of claim 16, further comprising a filter for filtering image data or signals from the detection device and suppressing image data or signal artifacts in dependence on the lifting height of the head block or the spreader.

23. The container crane of claim 1, further comprising a control unit for controlling travel operation of the trolley, said control unit constructed to initially move the trolley to a defined position above the transport vehicle before the processing unit is activated to determine the offset and rotation angle.

24. The container crane of claim 1, the adjustment mechanism includes plural adjustment cylinders.

25. A method of determining a misalignment between a load-carrying frame of a container crane and a transport vehicle, comprising the steps of:

- identifying a first longitudinal edge and a first transverse edge of the transport vehicle;
- identifying a second longitudinal edge and a second transverse edge of the load-carrying frame;
- calculating a distance between the first and second longitudinal edges and a distance between the first and second transverse edges to determine longitudinal and transverse center lines of the load-carrying frame and the transport vehicle in longitudinal and transverse direction; and
- checking the presence of an offset or rotation angle in dependence on a positional relationship between the center lines.

26. The method of claim 25, wherein the checking step includes the steps of intersecting the longitudinal and transverse center lines of the load-carrying frame to define a first intersection, and intersecting the longitudinal and transverse center lines of the load-carrying frame to define a second intersection, wherein a distance between the first and second intersections in x direction indicates an offset x direction, and a distance between the first and second intersections in y direction indicates an offset in y direction.

27. The method of claim 26, wherein a relative angle between the first and second longitudinal edges indicates the presence of a rotation angle.

28. The method of claim 26, and further comprising the step of correcting the presence of an offset and/or rotation angle by moving a spreader of the load-carrying frame in relation to a head block of the load-carrying frame.

* * * * *